June 3, 1930.  J. F. WHELAN  1,761,552
ELECTRIC MOTOR
Filed Jan. 26, 1929    2 Sheets-Sheet 1

Inventor
James F. Whelan
By Spencer, Hardman and Felix
Attorneys

June 3, 1930.  J. F. WHELAN  1,761,552
ELECTRIC MOTOR
Filed Jan. 26, 1929   2 Sheets-Sheet 2

Inventor
James F. Whelan
By Spencer, Hardman and Felw
His Attorneys

Patented June 3, 1930

1,761,552

UNITED STATES PATENT OFFICE

JAMES F. WHELAN, OF DAYTON, OHIO, ASSIGNOR TO DELCO PRODUCTS CORPORATION, OF DAYTON, OHIO, A CORPORATION OF DELAWARE

ELECTRIC MOTOR

Application filed January 26, 1929. Serial No. 335,171.

This invention relates to electric motors, and in particular to a mechanism for short circuiting the rotor windings especially such as is used in single phase motors.

An object of this invention is to improve the construction of the short circuiting element so as to provide a dependable short circuiting element at a very low cost of production. This is accomplished by deforming a helical coil made from copper wire and mounting this deformed helical coil on a slidable member mounted on the armature shaft. When the deformed helical coil is mounted on this slidable member, it simulates a pair of toroids joined by a plurality of bonds. As the slidable member is moved axially on the shaft, one of the toroids is brought into contact with the inner periphery of the commutator segments whereby the commutator segments are short circuited through the deformed helical coil. The commutator segments are also short-circuited by one of the toroids coming in contact with the segments and in contact on the slidable member. Being the commutator segments are short-circuited, through the slidable member, a smaller sized wire may be used in the making of this short circuiting element.

Further objects and advantages of the present invention will be apparent from the following description, reference being had to the accompanying drawings, wherein a preferred embodiment of one form of the present invention is clearly shown.

Figure 1:
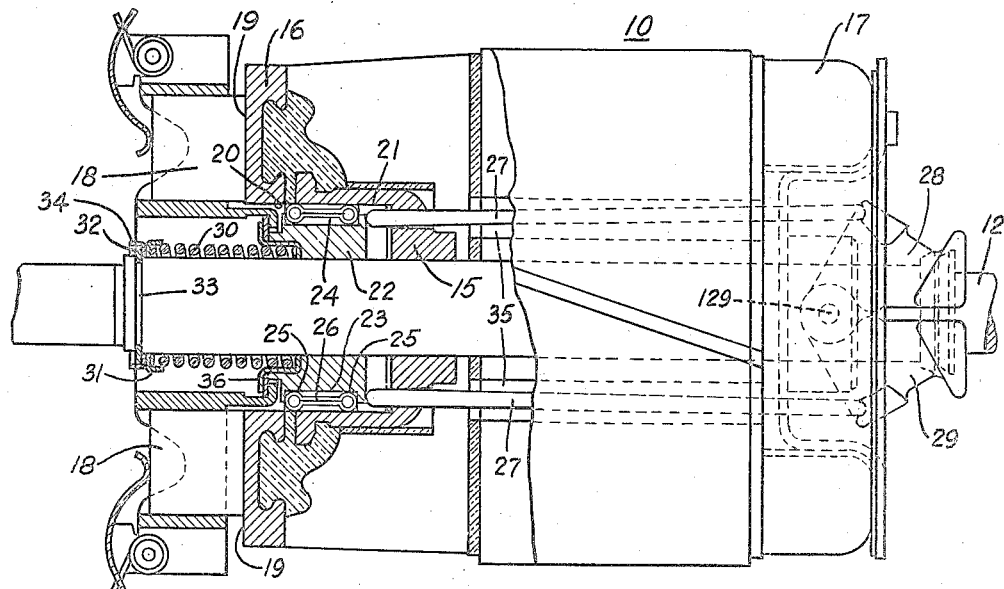
Fig. 1 is a sectional view of a rotor embodying this invention.

Referring to the accompanying drawings, 10 designates the armature or rotor attached to the shaft 12 of an induction motor. Mounted on the front of the armature is a commutator hub or spool 15 having mounted thereon, but insulated therefrom, the commutator 16 constructed of a plurality of insulated segments in the usual manner and connected to rotor winding 17 of any desired type. In the present instance, the commutator 16 is of the so-called radial type in which the brushes 18 bear yieldingly upon the radial face 19 of the commutator segments. The parts so far enumerated may be of any usual well known construction and will therefore require no further description.

The commutator 16 is provided with an internal recess having an internal cylindrical periphery 20 exposing the edges of the commutator segments. This recess 20 is of uniform diameter with the recess 21 of the commutator hub 15. Mounted for a sliding movement on the shaft 12 and within the recess 21 is a support or carrier 22. This support is adapted to fit loosely within the recess 20—21 so as to leave ample clearance therearound. The carrier 22 is further provided with an external annular groove or recess 23 adapted to receive a helix or contact element 24.

Figure 5:
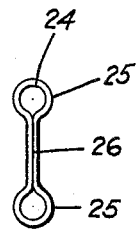
Fig. 5 is an end view of the deformed helical coil.

The helical garter or contact element 24 is really a deformed helical coil which may be made from a copper wire wound around a cylindrical core the same as a cylindrical coil or spring. After winding and removing from the core, the coil may be placed in a die to be formed so as to have either substantially two circular or rectangular rims or beads 25 joined by the bonds 26. A cross sectional view of this deformed helix simulates dumbbells as clearly seen in Fig. 5. This invention does not reside in this particular method of making the contact element 24, therefore any other method of making contact element 24, may be used within the purview of this invention of the article. Before assembling, the element 24 is elongated slightly so that its mean length is greater than the mean length of the circumference of the recess 23. The elongation causes the element 24 to exert a radial force against the periphery of the cylindrical surface of recess 20—21. It can readily be seen that the contact element 24 simulates, when assembled, a pair of concentric toroids 25 joined by parallel bonds 26.

To the rear of the armature is a pair of centrifugal elements 28 and 29. The elements 28 and 29 are of a special form so as to surround the shaft 12 and are pivoted thereto at 129. The pivot 129 is placed on the shaft somewhat forwardly of the center of gravity of the elements 28 and 29 so that when these elements move under the influence of centrifugal force the bodies thereof will bring forwardly about the pivot 129. Elements 28 and 29 cooperate with rods 27 freely movable in apertures 35 in the armature 10 to actuate the slidable member 22 forwardly against the force exerted by compression spring 30 which surrounds the armature shaft 12 and which is intermediate the cup-shaped spring retainers 31 and 36. Retaining member 31 is held in place by a spring clip 32 engaging an annular groove or recess 33 in the armature shaft 12. The spring clip 32 is held in place by a retaining washer 34. The spring 30 urges the support 22 rearwardly when the rotor is at rest. Rearward movement of the support 22 will exert pressure upon the rods 27 which in turn will rotate the centrifugal elements 28 and 29 toward the shaft 12 and at the same time contact elements 24 will be moved rearwardly so as to be out of contacts with the segments of the commutator 16.

*Operation*

Figure 2:
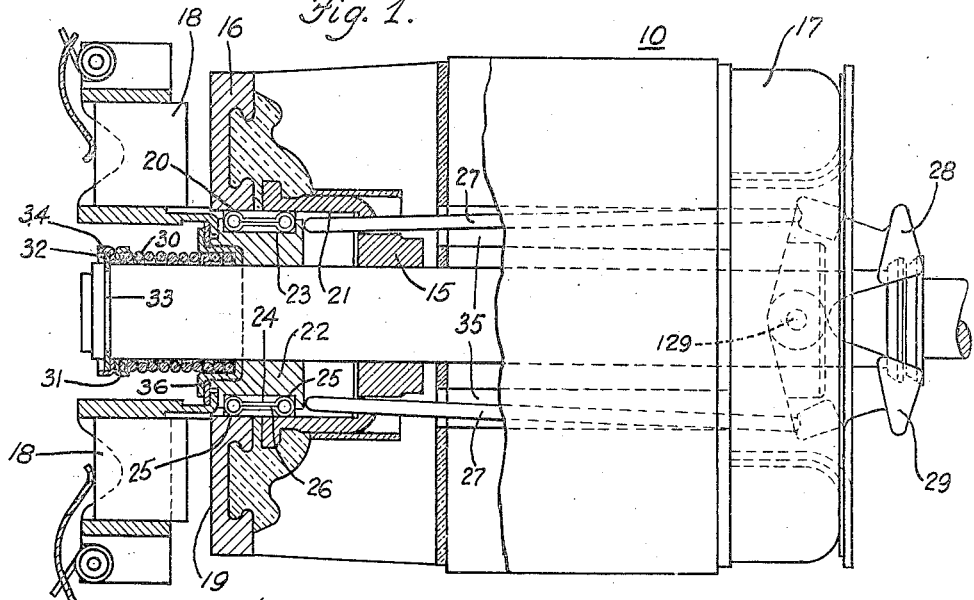
Fig. 2 is a sectional view similar to Fig. 1.
Figure 3:
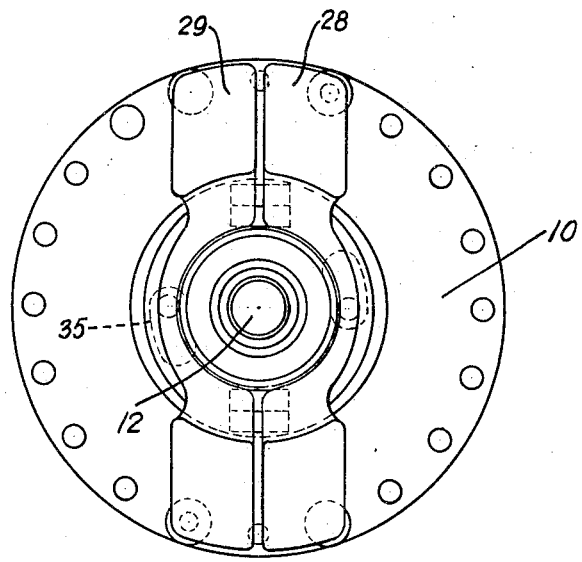
Fig. 3 is an end view of the centrifugal elements.
Figure 4:
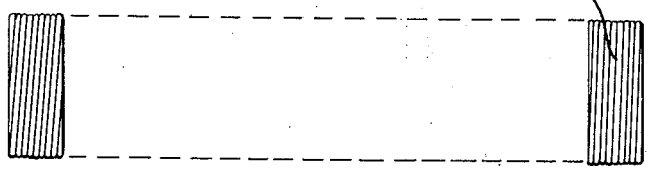
Fig. 4 is a plan view of a deformed helical coil before assembly.

When the rotor is at rest, the spring 30 urges the support 22 to the rear carrying the element 24 out of contact with the commutator segments and collapsing the centrifugal elements 28 and 29. When the motor starts up and gathers a speed, a point will be reached where the centrifugal force acting on the elements 28 and 29 and tending to move each of these outwardly and forwardly, will be sufficient to move the support 22 forwardly by means of rods 27 with sufficient force to overcome the pressure of the spring 30. The spring 30 may be chosen of such a strength that this force is attained at a predetermined speed. As soon as this speed is passed the centrifugal actions of the elements 28 and 29 will operate to slide the support 22 forwardly so as to carry the contacting element 24 into contact with the inner edge of the commutator segment, as is clearly shown in Fig. 2. When in this position, the toroid 25 of the contacting element 24 is adapted to form a series of bridges connecting the individual commutator segments with the hub 15 and with the sliding member 22 so as to short-circuit the comutator. The elongation of the contacting element 24, before assembly, tends to force the toroid 25 radially against the commutator segments so that a firm contact is made with the commutator segments. There is thus provided an effective short-circuit for the commutator.

While the form of embodiment of the present invention as herein disclosed, constitutes a preferred form, it is to be understood that other forms might be adopted, all coming within the scope of the claims which follow. What is claimed is as follows:

1. In an alternating current motor having a commutator, means for short-circuiting said commutator, comprising a deformed helical member, a sliding support for said member, centrifugal elements for sliding said support to move said deformed helical member into contact with the commutator.

2. In an alternating current motor having a commutator, means for short circuiting said commutator, comprising a deformed helical contacting coil, means slidably mounted on the armature shaft of said motor, said second means having an annular recess for supporting the deformed helical coil, speed responsive means for moving said support axially whereby the deformed helical coil contacts with the commutator.

3. In an alternating current motor according to claim 2, in which the deformed helical coil simulates a pair of concentric toroids joined by parallel bonds.

4. In a switching device, the combination of a rotary member having a cylindrical recess having a conducting surface and a non-conducting surface side by side, said recess being concentric with the axis of rotation of the rotary member with a pair of helical toroids joined by bonds, a support for said helical toroids for supporting the toroids in contact with the cylindrical surface of said recess and means for moving said support and said helical toroids axially in said recess so as to cause an electrical contact to be made by the toroids moving into contact with the conducting surface and so as to break the electrical contact by moving the toroids out of contact with the conducting surface.

5. In an alternating current motor having a commutator assembly, comprising a metallic spool and commutator segments insulatingly supported on said spool, said commutator assembly having a cylindrical recess extending through said commutator annulus into said spool with movable means for short circuiting said commutator segments to said spool, said movable means including a pair of toroids joined by parallel bonds, said movable means being mounted in the cylindrical recess so that one of the toroids is always in contact with the spool, and means for moving said means to cause other of said toroids to form a contact with the commutator segments so as to short circuit the commutator segments to said spool.

6. In an electrical switch, a circuit closer comprising an annular support having an annular recess in its periphery with a flattened helix mounted in the recess, said helix simulating a dumb-bell in cross-section.

7. In an electrical switch, a circuit closer comprising the combination of a member having a cylindrical recess with a pair of concentric integral toroids joined by bonds, said toroids being mounted in the cylindrical recess.

8. In an electrical switching mechanism, the combination of a rotary member having a cylindrical recess concentric with the axis of rotation of the rotary member with a circuit closer consisting of a pair of helical toroids joined by bonds mounted in the cylindrical recess, said toroids being concentric with the axis of the cylindrical recess.

9. In an electrical switching mechanism, the combination of a rotary member having a cylindrical recess concentric with the axis of rotation of said rotary member, said rotary member including terminals axially disposed, with a circuit closer including a pair of movably supported helical toroids joined by bonds, each of said toroids having its circumference in contact with the peripheral surface of the cylindrical recess, and means for actuating said toroids so as to move the toroids either into or out of contact with one of said terminals so as to close or open the switch.

10. In an electrical switching mechanism, a circuit closing garter, said garter simulating a pair of toroids joined by bonds.

In testimony whereof I hereto affix my signature.

JAMES F. WHELAN.